United States Patent [19]

Neuman et al.

[11] Patent Number: 4,490,767
[45] Date of Patent: Dec. 25, 1984

[54] MANUALLY OPERATED CONDITIONER FOR FLEXIBLE MAGNETIC DISKS

[75] Inventors: Eli Neuman, Tarzana; C. Paul Davis, Woodland Hills, both of Calif.

[73] Assignee: Perfectdata Corporation, Chatsworth, Calif.

[21] Appl. No.: 366,544

[22] Filed: Apr. 8, 1982

Related U.S. Application Data

[63] Continuation-in-part of Ser. No. 257,769, Apr. 27, 1981, abandoned.

[51] Int. Cl.³ .............................................. G11B 5/00
[52] U.S. Cl. .................................... 360/137; 360/128; 15/100; 369/72
[58] Field of Search ............ 360/137, 133, 135, 97–99, 360/128; 15/100, 210 R; 369/72–74

[56] References Cited

U.S. PATENT DOCUMENTS

| 2,987,955 | 6/1961 | Sassenberg | 15/100 X |
|---|---|---|---|
| 3,019,464 | 2/1962 | Grunwald et al. | 15/100 |
| 3,479,222 | 11/1969 | David et al. | 15/302 X |
| 4,107,810 | 8/1978 | Varni et al. | 360/137 X |
| 4,139,876 | 2/1979 | Owens | 360/97 |
| 4,166,626 | 9/1979 | Sandor et al. | 369/72 |
| 4,177,491 | 12/1979 | Jahn | 360/133 X |
| 4,211,580 | 7/1980 | Vowles | 360/137 X |
| 4,241,368 | 12/1980 | Tadokord et al. | 360/137 X |
| 4,324,014 | 4/1982 | Stutz, Jr. et al. | 360/137 |

FOREIGN PATENT DOCUMENTS

| 2809292 | 9/1979 | Fed. Rep. of Germany | 369/72 |
|---|---|---|---|
| 54-134602 | 10/1979 | Japan | 369/72 |
| 55-67902 | 5/1980 | Japan | 369/72 |
| 55-142468 | 11/1980 | Japan | 369/72 |
| 2066997 | 7/1981 | United Kingdom | 369/72 |

Primary Examiner—John H. Wolff
Attorney, Agent, or Firm—Spensley Horn Jubas & Lubitz

[57] ABSTRACT

A simple and inexpensive apparatus for treating a floppy disk with conditioning fluid in order to clean, lubricate and destaticize the floppy disk is described. The apparatus comprises a means for grasping the floppy disk about its center and rotating it, fluid absorbing pads which are moveable into and out of contact with the magnetic surfaces of the floppy disk through the read/write opening in the floppy disk envelope by mechanical means and a means for dispensing fluid to the pads. In one preferred embodiment, the mechanical rotation of a lever causes the floppy disk to be grasped and released through the cooperation of an axial cam and a pin riding on the cam. Rotation of the lever also moves the pads into and out of contact with the floppy disk. In a second preferred embodiment, a timer provided with a gear wheel controls an axial cam for grasping and releasing the floppy disk and a radial cam which moves the pads into and out of contact with the floppy disk.

10 Claims, 16 Drawing Figures

MANUALLY OPERATED CONDITIONER FOR FLEXIBLE MAGNETIC DISKS

BACKGROUND OF THE INVENTION

1. Reference to Earlier Application

This application is a continuation in part of the now pending U.S. patent application, Ser. No. 257,769, filed Apr. 27, 1981 now abandoned, the same inventors.

2 Field of the Invention

This invention relates to the field of devices for cleaning and conditioning rotating flexible magnetic information storage media, including the type commonly known as floppy disks (or diskettes).

3. Prior Art

An important problem facing the users of flexible magnetic disks arises from contamination in the form of dust, oils, oxide redeposits and airborne particulate matter being deposited on the disks. The problem is compounded by the fact that particulate matter is attracted to and adheres to the disks due to static electricity.

An additional problem results from the wear experienced by the disks as a result of the read/write heads and the corresponding wear on the read/write heads themselves. These wear problems are caused by friction between the disks and the heads which deletes any lubricant used and by contaminants being transferred from the recording surfaces to the read/write heads themselves.

In the last few years, technology using floppy disks has developed to the point where floppy disks are now found not only in institutions and facilities that use large computers, but also in small offices and businesses that may employ a system for word processing or a small computer for billing or for keeping track of inventory. The problem of contamination of the floppy disk surfaces are magnified in these environments because the floppy disks are being handled by people whose job responsibilities may be only partially related to the use of the floppy disks or whose training may be minimal and in environments where contamination may not be as easily controlled. At the same time, the density of stored information on floppy disks is becoming greater and greater so that failures due to contamination and particulate matter on the disk become more and more serious.

A need, therefore, exists for a low-cost device to clean, lubricate and de-staticize floppy disks that is simply operated and can be used in an office or business environment.

Until the present invention, the above problems of dust contamination, particle related failures and friction have not been adequately dealt with in a low-cost device. In a previous patent application, U.S. Patent application No. 257,769, the inventors herein disclosed a device which adequately dealt with the problems of cleaning, lubricating, and de-staticizing floppy disks. In the previous invention disclosed by the inventors in the above-referenced patent application, electrical timing signals from a timer controller were used to automatically control the operation of the device so that all that an operator had to do after inserting the floppy disk into the device was to press a button to initiate the operation of the device. The timing signals were used to control various motors and pumps employed during the conditioning cycle. Since, that device is fully automated, its cost might be prohibitive for a small office or business which uses only a few floppy disks in its operations. The present invention is of vastly simpler construction than the device disclosed in that application so that its cost is lower. On the other hand, only slightly more operator interface is necessary in order to perform the steps that enable the device to clean, lubricate and de-staticize floppy disks. No special skills, however, are necessary and the device can be operated by virtually anyone responsible for handling floppy disks.

One known device for allegedly cleaning the surfaces of flexible magnetic disks uses a sapphire scraper which scrapes the surface of the disk. The floppy disk is caused to be pressed against the sapphire scraper by a vacuum pump which also removes the particulate matter from the vicinity of the disk. The operation occurs while the disk is rotating. It is not known how effective this device is for cleaning floppy disks. However, it is believed that it does not and cannot at all de-staticize or lubricate the disk.

With the present invention, on the other hand, a floppy disk may be conditioned, i.e., cleaned, lubricated and de-staticized all at once using a highly volatile conditioning fluid which is simultaneously applied to both sides of the floppy disk while it is rotating.

An operator first measures out into a specially designed and constructed reservoir enough conditioning fluid to condition both sides of one floppy disk. This fluid then saturates pads which are placed into contact with the floppy disk through the read/write windows. By the turning of a single lever by the operator, an arrangement of mechanical components allows the disk, in one embodiment, to be grasped near its center, an electrical motor to be started which rotates the disk and the saturated foam pads to be placed into contact with the disk. Simultaneously with the starting of the electrical motor, a timer is started so that the conditioning procedure takes place for a measured interval of time. The slowly rotating shaft of the timer is provided with a cam which, after an interval of time, causes the foam pads to be slightly lifted from the surface of the floppy disk while the disk continues rotating. This permits conditioning fluid remaining on the disk to evaporate. Thereafter, the cam causes the electrical motor to be turned off so that the rotation of the disk ceases. The lever is then turned in the direction opposite to which it was initially turned and the disk, which is now cleaned, lubricated and de-staticized, is removed from the device.

In a second embodiment, a timing motor controls each step of the of conditioning procedure. The timing motor is provided with a gear wheel which is actuated after the pads have been saturated with conditioning fluid. A second gear wheel interacting with the first is mechanically linked to cams for first causing the disk to be grasped and rotated and for thereafter placing the saturated pads into contact with the disk. After an interval of time during which the disk is treated with conditioning fluid, the pads are lifted slightly from the surface of the disk. Thereafter rotation is stopped and the disk is released.

SUMMARY OF THE INVENTION

A primary object of the present invention is to provide a simple and inexpensive apparatus for conditioning, i.e., cleaning, lubricating and de-staticizing, flexible magnetic disks without in any way destroying or altering the data on the disk. To this end, the present invention has a mechanism for grasping the flexible magnetic disk near its central opening. The mechanism comprises a spindle rotated by an electrical motor and a clutch mechanism which, when engaged, presses the portion of the floppy disk near the central opening of the disk against the spindle mechanism, permitting the floppy disk to be rotated within its envelope. The freely rotating clutch is mounted on a shaft provided with a radially extending clutch engaging pin or cam follower which rides on a helical surface or axial cam around the shaft. When the shaft is rotated relative to the helical surface, the shaft moves longitudinally in order to engage or disengage the clutch.

The actual conditioning of the disk is performed by two small pads. These pads access the floppy disk surface through the read/write openings in the disk jacket. The pads are mounted on either side of the disk on pivoting pad swing plates so that they can be moved into and out of contact with the disk.

A fluid dispenser with a pivoted fluid metering cover is located above the pads in order to supply the conditioning fluid to the pads before they are placed into contact with the floppy disk. After the metering cover has been filled with the required amount of fluid, the cover is closed allowing the fluid in the metering cover to spill into the fluid dispenser. The conditioning fluid is directed by tubing to an opening in the pad swing plates in order to saturate the pads mounted therein.

In a first preferred embodiment, rotation of the floppy disk is initiated automatically when the clutch and spindle are deployed to grasp the floppy disk; the turning of the lever on the shaft causes a second pin radially extending from the shaft to depress a microswitch after the clutch has pressed the floppy disk against the spindle. This causes the electric motor which rotates the spindle to begin operation.

In this embodiment, the pad swing plates are mechanically coupled to the shaft. After the shaft is rotated by a lever protruding radially from it to engage the clutch and spindle in order to grasp and rotate the floppy disk, further rotation of the shaft causes the pads to swing into contact with the floppy disk after the clutch and spindle have engaged and are rotating the floppy disk.

This embodiment uses a timer motor equipped with a rotating cam. The timer motor begins operation simultaneously with the electric motor. After a predetermined period of time, the timer cam presses against the clutch engaging pin or cam follower to rotate the shaft a small amount. Because the clutch engaging pin is riding on a non-helical portion of the surface of the cam, the clutch and spindle remain engaged. However, the rotation of the shaft does cause the pads to be swung out of contact with the floppy disk. The continuing rotation of the floppy disk, however, permits whatever conditioning fluid remains on it to evaporate without leaving streaks or parting lines on the disk. Thereafter, the timer cam depresses a second microswitch stopping the electric motor and the timer motor. The conditioning procedure is complete and the floppy disk may be removed by turning the lever of the shaft to disengage the clutch and spindle, releasing their grasp of the floppy disk.

In a second preferred embodiment, the timer cam has a gear wheel mounted thereon. This gear wheel engages a second gear wheel which is mounted coaxially with the shaft on bearings. The electric motor which rotates the spindle is started simultaneously with the timer motor. The clutch and spindle are then deployed to grasp the floppy disk using an axial cam and cam follower similar to that used in the first preferred embodiment. The pad swing plates are mechanically coupled to a radial cam which rotates with the second gear wheel. This radial cam controls an actuating arm which causes the pads to be swung into contact with the floppy disk after a predetermined period of time so that the surfaces of the floppy disk can be conditioned by the pads saturated with conditioning fluid.

After the disk has been treated, the timer motor causes the radial cam to rotate so that the saturated pads are moved slightly away from the surfaces of the floppy disk, the rotation of the floppy disk continuing so that whatever conditioning fluid remains on the disk can evaporate. Further rotation of the timer gear causes the clutch engaging pin or cam follower to ride on a helical surface of the axial cam so that the clutch is disengaged from the disk and the spindle. A limit switch shuts the timer motor and the electric motor off. The conditioning procedure has been completed, and the floppy disk may immediately be put back into use.

DESCRIPTION OF A PREFERRED EMBODIMENT OF THE PRESENT INVENTION

The preferred embodiments of the present invention described herein are simple and inexpensive apparatuses especially useful for conditioning the surfaces of flexible rotatable magnetic disks, commonly referred to as floppy disks or diskettes.

Figure 1:
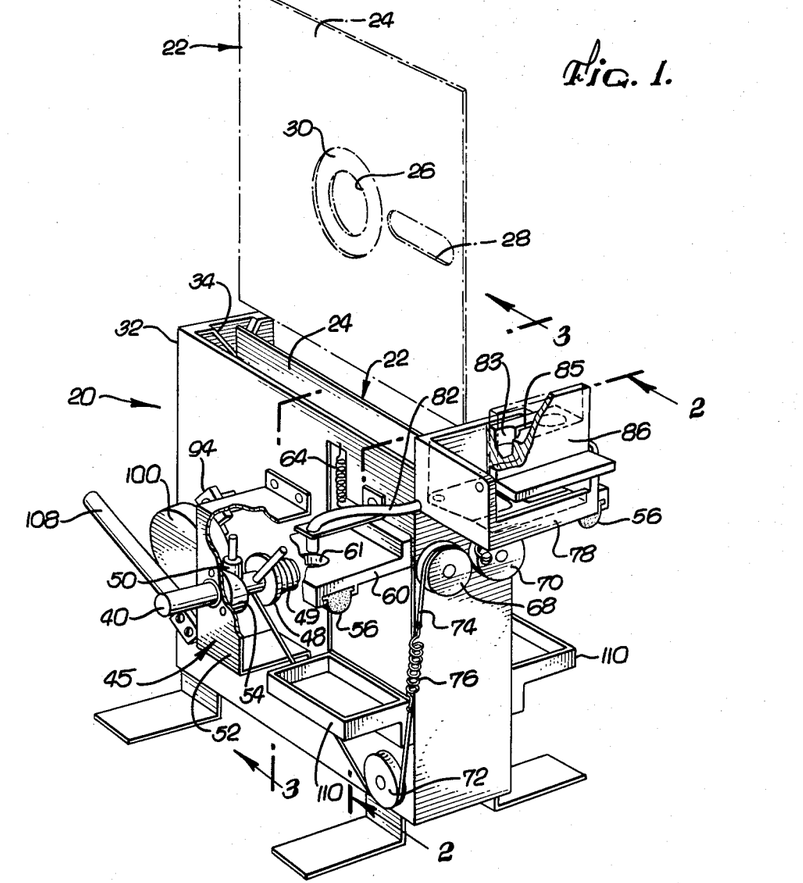
FIG. 1 is a perspective view of a first preferred embodiment of the present invention with a flexible magnetic disk inserted therein. The flexible magnetic disk is also shown in phantom above the apparatus of the present invention before its insertion.

Referring first to FIG. 1, a perspective view of the apparatus 20 of a first preferred embodiment of the present invention is presented with a floppy disk 22 contained in an envelope or jacket 24 shown in detail above the apparatus 20. The floppy disk 22 is a very thin circular disk having one or both sides coated with a magnetic material for information storage. In order to facilitate the handling of the floppy disk 22 and protect the information storing surface, the floppy disk 22 is generally disposed within a thin stiffened jacket or envelope 24, which is typically made of stiff paper, cardboard, plastic or the like. Access to the magnetic surfaces of the disk 22 by read/write heads is provided by openings 28 in the envelope 24 of the floppy disk 22. Floppy disks having two magnetic information storing surfaces have read/write openings 28 directly opposite each other on the two sides of the envelope 24. In normal use, therefore, the envelope 24 is held at its edges so that it does not rotate while the floppy disk 22 is rotated. With the present invention, the floppy disk 22 is treated with conditioning fluid through the read/write openings 28 as it rotates, thereby allowing the entire read/write area of the disk to be cleaned, lubricated and de-staticized.

The floppy disk 22 is inserted into the main or media compartment 32 of the apparatus by sliding it in its envelope 24 vertically downward into the media compartment 32. The envelope 24 slips into media guides 34 located on the ends of the media compartment 32. The media guides 34 may be seen more particularly in FIGS. 2 and 3.

The floppy disk 22 is grasped by the apparatus 20 in a region 30 adjacent to its central opening 26 by means of facing annular surfaces 37 and 39, one of which contains an O-ring 43 disposed in a groove 41. The O-ring 43 is slightly thicker than the depth of the groove 41 so that it protrudes slightly beyond the surface 39. The annular surface 39 is coupled to a spindle 38 which is rotated by an electric motor 88. The annular surface 37 is a part of a clutch 36 which engages the spindle 38 when a clutch engaging and disengaging mechanism 45 is activated.

The clutch engaging and disengaging mechanism 45 comprises a shaft 40, the end of which is coupled to the clutch 36 by bearings 73. A radially extending clutch engaging pin or cam follower 50 on the shaft 40 rides on a helically surfaced axial cam so that rotation of the shaft 40 results in a displacement of the shaft 40 along its length, thereby moving the clutch 36 toward or away from the spindle 38 depending on the direction of rotation.

Through the cooperation of the above described components, floppy disk 22 may be grasped and rotated within its envelope 24, envelope 24 not being grasped by the surfaces 37 and 39 and therefore not being rotated with the floppy disk 22 due to the square shape of envelope 24 and its placement within the media guides 34 of the media compartment 32.

The approach taken by the present invention is to treat the magnetic surfaces of the floppy disk 22 by use of pads saturated with special conditioning fluid. For this reason, the fluid conditioning pads 56 and associated components are situated so that the pads 56 contact the magnetic surfaces of the floppy disk 22 through the read/write opening 28, pads 56 spanning the entire width of the portion of the floppy disk 22 which is used for information storage. The pads 56 are coupled to pad swing plates 60 which pivot on pins 62 oriented parallel to the nominal plane of the floppy disk 22. An arrangement of springs, pulleys and other components couple the pad swing plates 60 to the clutch engaging and disengaging mechanism 45 and permits the pad swing plates 60 to be swung toward or away from the magnetic surfaces of the floppy disk 22.

Figure 2:
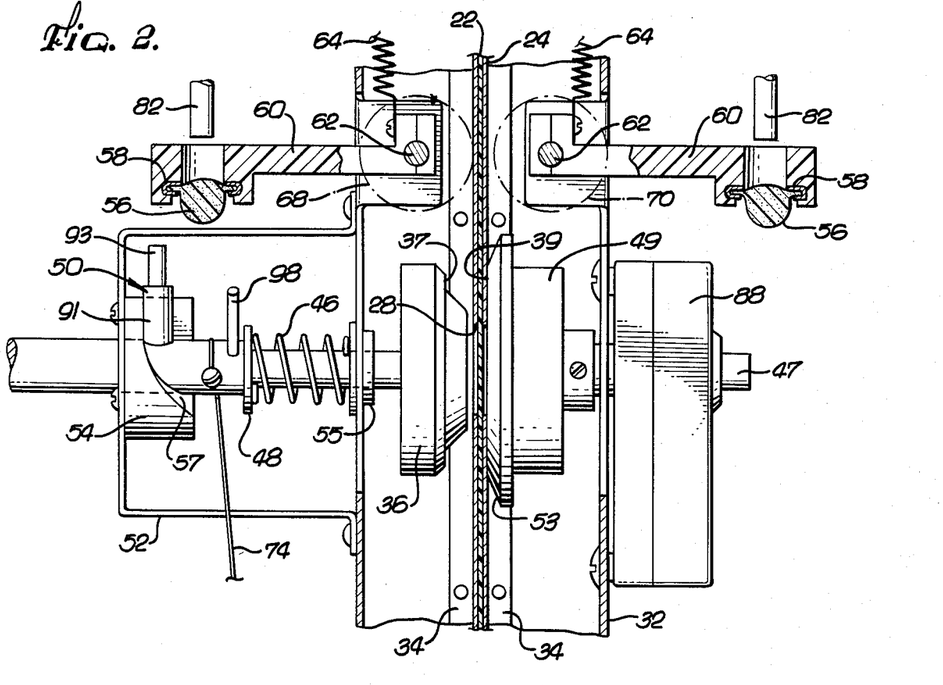
FIG. 2 is a partial cross-sectional view of the preferred embodiment of the present invention shown in FIG. 1 taken along the lines 2—2 in FIG. 1.

The pads 56 are saturated with conditioning fluid when they are held away from the surfaces of the floppy disk 22, in the position such as is shown in FIGS. 1 and 2. A fluid dispenser 78 with a pivoted fluid metering cover 86 is disposed above the pad swing plates 60 and pads 56. With the pivoted fluid metering cover 86 in the open position, an operator may pour fluid to a specified level within the fluid metering cover 86. The cover 86 is thereafter closed spilling the conditioning fluid into the dispenser 78. The conditioning fluid flows by means of gravity through tubes 82, saturating the pads 56 through openings 61 in the back of the pad swing plates 60. Any excess fluid on the pads 56 is permitted to drip into the trays 110.

After the floppy disk 22 and its envelope 24 have been inserted into the apparatus 20 and the pads 56 saturated with conditioning fluid, the clutch engaging and disengaging mechanism 45 is activated so that the floppy disk 22 is grasped by the surfaces 37 and 39 and the pad swing plates 60 are swung downward enabling the pads 56 to contact the floppy disk 22 through the read/write openings 28. The floppy disk may then be rotated and conditioned.

The particular structure and components of a preferred embodiment of the present invention will now be described in more detail with respect to the FIGURES. The conditioning process on a floppy disk 22 is begun by inserting the floppy disk 22 in its envelope 24 into the media compartment 32 of the apparatus 20 between the media guides 34. Each guide is comprised of a narrowly separated pair of bars, which may be teflon, aluminum or other material, vertically positioned and attached by fasteners to the ends of the media compartment 32. The spacing between the bars for each guide 34 permits the envelope 24 of a floppy disk 22 to be slid downward in the guides 34 but does not permit very much lateral movement of the envelope 24. It is essential that the floppy disk 22 and its envelope 24 be inserted into the media compartment 32 with its read/write openings 28 located as shown in FIG. 1 so that the pads 56 will have access to the surfaces of the floppy disk 22 for the conditioning procedure.

When the floppy disk 22 has been correctly inserted into the media compartment 32, the central opening 26 of the floppy disk is concentric with the clutch 36 and the spindle 38. The spindle 38 comprises a shaft 47 which is rotated by an electric motor 88 and a cup-shaped spindle wheel 49 containing an annular rim or surface 39 for grasping the floppy disk 22. The electric motor 88 is mounted outside the media compartment 32 with the shaft 47 protruding through the media compartment 32. The spindle wheel 49 is mounted by means of a collar 51 to the shaft 47 on the inside of the media compartment 32. The axis of the shaft 47 passes through the center opening 26 of a properly inserted floppy disk 22, but no part of the spindle 38 itself penetrates the nominal plane of a properly inserted floppy disk 22.

The cup-shaped spindle wheel 49 is positioned so that its cup portion extends toward the nominal plane of the floppy disk 22. An annular surface 39 is formed on the edge of its rim parallel to the nominal plane of the floppy disk 22. This surface 39 is located either at or very close to the nominal plane of the floppy disk 22 and has an inside radius approximately equal to the radius of the center opening 26 of the floppy disk 22 and an outside radius slightly greater than the radius of the center opening 26 of the floppy disk 22. Thus, a portion 30 of the floppy disk 22 near its central opening 26 but which is not covered by the floppy disk envelope 24 may be pressed against the surface 39.

The annular surface 39 contains an annular groove 41 in which is disposed an elastomeric O-ring 43. The thickness of O-ring 43 is slightly greater than the depth of the annular groove 41 in order to enhance the friction between the floppy disk 22 and the spindle 38 when the floppy disk 22 is pressed against the spindle wheel 49 and to thereby increase the rotating torque supplied by the spindle 38 to the disk 22.

A second annular surface 53 is located adjacent to and concentric with the annular surface 39. As the radius of this second annular surface 53 increases, the surface moves further from the nominal plane of the floppy disk 22. This second annular surface 53 thus helps guide the floppy disk envelope 24 past the spindle wheel 49 and the annular surface 39 as the envelope 24 is inserted into the media compartment 70 between the guides 34.

Figure 3:
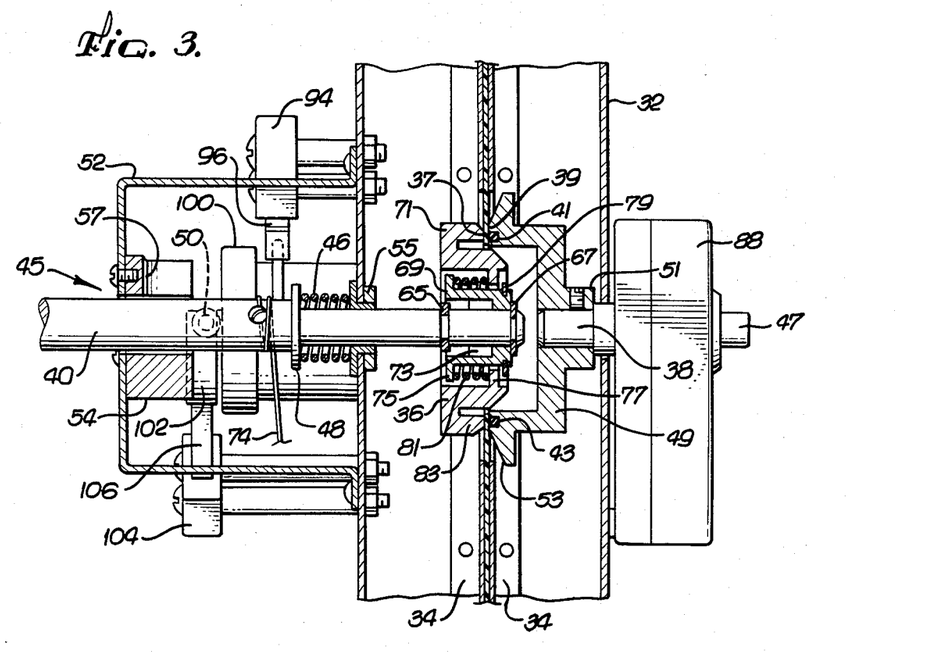
FIG. 3 is a partial cross-sectional view of the preferred embodiment of the present invention shown in FIG. 1 taken along the lines 3—3 in FIG. 1.

On the opposite side of the floppy disk 22 from the spindle 38 is located a clutch 36 and clutch engaging and disengaging mechanism 45. The clutch engaging and disengaging mechanism 45 comprises a shaft 40 mounted in a bearing 55 and extending through a wall of the media compartment 32 and through a wall of the mechanism enclosure 52, as shown in FIGS. 2 and 3.

The shaft 40 is oriented along the same line as is the spindle 38 and moves longitudinally along the same axis about which the spindle 38 rotates, hereinafter sometimes referred to as the disk axis. In addition, shaft 40 rotates, but this rotation is limited to a total of one complete revolution or less.

A coil spring 46 is disposed around the shaft 40 in the region adjacent to and outside of the media compartment 32. A spring retainer 48 is secured to shaft 40 in order to hold spring 46 in position. Spring 46 tends to push shaft 40 and clutch 36 away from a floppy disk 22 disposed in the media compartment 32.

Figure 4:
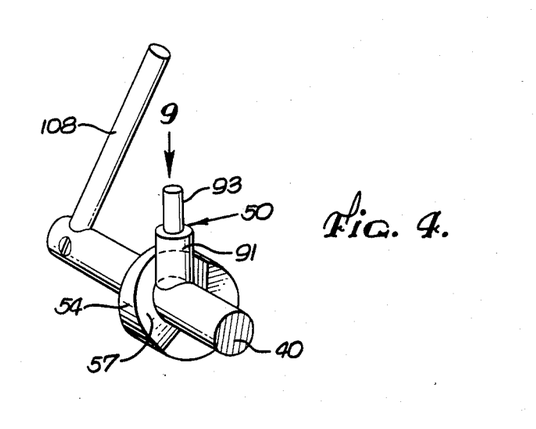
FIG. 4 is a perspective view of a portion of the clutch engaging mechanism of the preferred embodiment of the present invention shown in FIG. 1, showing particularly the helically surfaced cam and radial clutch engaging pin or cam follower.

The longitudinal motion of shaft 40 and clutch 36 is limited by the clutch engaging pin or cam follower 50 radially protruding from the shaft 40 and contacting an axial cam 54. Clutch engaging pin or cam follower 50 preferably comprises a roller 91 over a nonrotating pin 93, as shown in FIG. 4.

Axial cam 54 is attached to mechanism enclosure 52 and has an opening in its center through which shaft 40 extends. The roller 91 of clutch engaging pin or cam follower 50 rides on the surface 57 of axial cam 54 which faces generally toward the floppy disk 22. A portion of the surface 57 of axial cam 54 is helically disposed relative to shaft 40, as can best be seen in FIGS. 4 and 9. It will be appreciated that as shaft 40 is rotated, clutch 36 approaches or retreats from floppy disk 22 depending on the portion of the surface 57 contacted by the clutch engaging pin or cam follower 50. As will be more particularly described, clutch 36 is engaged and disengaged with the floppy disk 22 and the spindle 38 by such rotation of the shaft 40. A lever 108 is provided at that end of the shaft 40 which extends outside of the mechanism enclosure 52 in order to facilitate the engaging and disengaging of the clutch 36.

Clutch 36 is mounted on shaft 40 by means of retaining rings 65 and 67 placed on shaft 40. As best seen in FIG. 3, the clutch 36 has an inner concentric portion 69 and an outer concentric portion 71. The inner concentric portion 69 of the clutch 36 is coupled to the shaft 40 by means of bearings 73 press-fitted into inner concentric portion 71. Retaining rings 65 and 67 attached to shaft 40 prevent inner concentric portion 69 from moving longitudinally with respect to shaft 40. Forming a thick cylindrical sleeve about shaft 40, the inner concentric portion 69 has an outwardly extending annular rim 75 located on its outer cylindrical surface. This annular rim 75 is positioned on the inner concentric portion 69 toward the end furthest from the spindle 38.

The outer concentric portion 71 of the clutch 36 has a cylindrical inner surface and is placed concentrically with the inner concentric portion 69. The inside radius of the cylindrical inner surface of the outer concentric portion 71 is slightly larger than the radius of the outwardly projecting annular rim 75 located on the inner concentric portion 69. Extending inward from the cylindrical surface of the outer concentric portion 71 and positioned toward the end closest to spindle 38 is an inwardly extending annular rim 77, the inside radius of which is slightly larger than the radius of the inner concentric portion 69. The outer concentric portion 71 is thus permitted to move longitudinally with respect to the inner concentric portion 69 and shaft 40.

Toward the side of inner concentric portion 69 closest to the spindle 38 is a small annular groove for holding a retaining ring 79. The outer radius of retaining ring 79 is slightly larger than the inside radius of the inwardly extending annular rim 77 of the outer concentric portion 71. Thus, retaining ring 79 and the outwardly extending annular rim 75 located on the inner concentric portion 69 limit the possible longitudinal movement of the outer concentric portion 71 with respect to the inner concentric portion 69 and the shaft 40.

A helical spring 81 whose inside radius is larger than the radius of the inner concentric portion 69 and whose outside radius is smaller than the inside radius of the outer concentric portion 71 is placed between the inner concentric portion 69 and the outer concentric portion 71. This spring 81 is placed between and bears against the facing surfaces of the outwardly extending annular rim 75 of the inner concentric portion 69 and the inwardly extending annular rim 77 of the outer concentric portion 71. The friction between these surfaces and the ends of the spring 81 assures that outer concentric portion 71 rotates with the inner concentric portion 69 while retaining some freedom of longitudinal motion with respect to the inner concentric portion 69 and the shaft 40 and some freedom to tilt relative to these components. Spring 81 tends to press the outer concentric portion 71 forward toward the spindle 38 so that the inwardly extending annular rim 77 bears against the retaining ring 79. It will be noticed, however, that the outer concentric portion 71 may be pushed back compressing spring 81, thereby moving the outer concentric portion 71 longitudinally relative to the inner concentric portion 69 and the shaft 40. However, when not so pushed, the inwardly extending annular rim 77 of the outer concentric portion 71 rests against the retaining ring 79.

The outer concentric portion 71 has a recessed rim 83 with a plane annular surface 37 located thereon and situated parallel to the annular surface 39 located on the spindle wheel 49. The inner and outer radii of the annular surface 37 are approximately the same as those on the corresponding annular surface 39 located on the spindle wheel 49. When the clutch 36 is initially moved toward the spindle 38, the annular surface 37 and the O-ring 43 initially will contact and bear against the portion of the floppy disk 22 adjacent to its center opening 26. After this initial contact, further movement of the clutch 36 toward the spindle 38 results in O-ring 43 being compressed. The amount of compression of O-ring 43 and thus the force with which the floppy disk is grasped is determined by the spring constant and the amount of compression of the spring 81, and not only by the total force upon the shaft 40 tending to push the shaft 40 toward the spindle 38. The spring constant and the amount of compression are selected so that O-ring 43 is compressed partially or totally within annular groove 41 and the floppy disk 22 is securely grasped, as shown in FIG. 3.

It will also be noticed that the annular surface 37 is recessed from the front surface of the clutch 36. However, when the spring 81 is compressed as in FIG. 3, this recess is less than the distance from the annular surface 39 to the bottom of the cup-shaped spindle wheel 49 so that the clutch 36 and the end of the shaft 40 do not come into direct contact with the spindle wheel 49.

After floppy disk 22 has been inserted into the media compartment 32, the pads 56 used to condition the magnetic surfaces of the floppy disk 22 may be saturated with cleaning fluid. In a preferred embodiment, the pads 56 are formed of plastic open-celled foam and are covered with cloth. To facilitate use in the apparatus 20, each pad 56 is held in a clip 58. Pad clip 58 is mounted on a pad swing plate 60, which is a generally rectangular plate pivotally mounted to media compartment 32. Each pad swing plate 60 pivots about a pivot pin 62. Pad 56 and pivot pin 62 are both parallel to the surface of a properly positioned floppy disk 22 and to the long direction of the read/write openings 28 in the floppy disk envelope 24. Pad 56 thus may be brought into contact with the floppy disk 22, accessing the floppy disk 22 through the read/write opening 28 when the pad swing plate 60 is pivoted about the pivot pin 62.

Return springs 64 are each connected at one end to a pad swing plate 60 and at the other end to a point on the media compartment 32 above the pad swing plate 60. Return springs 64 tend to pull the pads 56 and the pad swing plates 60 away from the floppy disk 22 into the horizontal position, such as is shown in FIGS. 1 and 2.

Attached to that end of each pivot pin 62 which extends outside the media compartment 32 are pulleys 68 and 70. Pulleys 68 and 70 contain narrow grooves along their peripheries for placement therein of a line 74. Line 74 is attached to pulleys 68 and 70 and proceeds in the groove of pulley 70 in a clockwise direction and then in the groove of pulley 68 in a counterclockwise direction as viewed in FIGS. 1 and 2. Line 74 then proceeds downward and around a third pulley 72 and to shaft 40 where it is attached and on which it may be wound as shaft 40 rotates. Thus, as shaft 40 is rotated to wind line 74 about shaft 40, the tension in line 74 is increased and the force of return springs 64 is overcome. This causes the pad swing plates 60 to swing downward and the foam pads 56 to be placed into contact with the floppy disk 22. When the shaft 40 is rotated to unwind the line 74, the force of return springs 64 returns the pad swing plates 60 to the horizontal position. Tension spring 76 limits the force with which the pads 56 on the pad swing plate 60 are pressed against the floppy disk 22.

Figure 10:
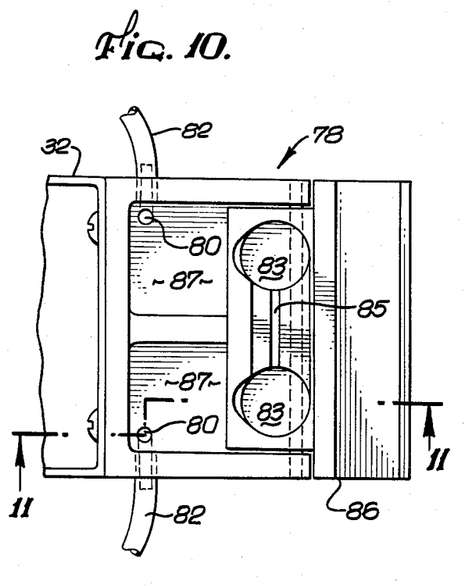
FIG. 10 is an overhead view of the fluid dispenser used in the preferred embodiment of the present invention shown in FIG. 1.
Figure 11:
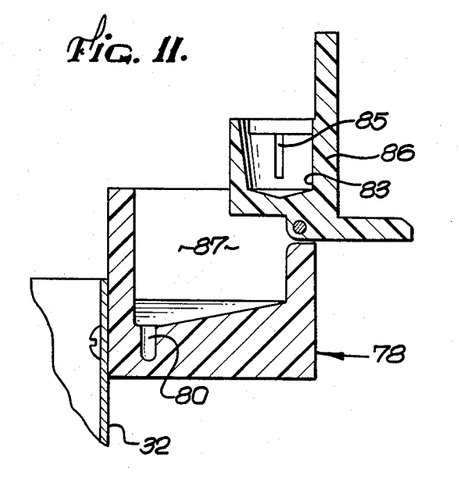
FIG. 11 is a cross-sectional view of the fluid dispenser shown in FIG. 10 taken along the lines 11—11 in FIG. 10, showing the fluid metering cover in the open position.
Figure 12:
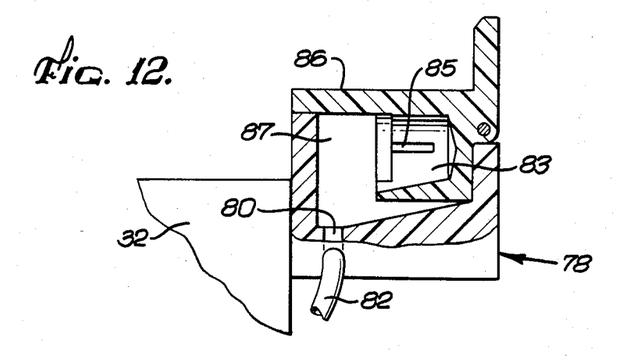
FIG. 12 is a cross-sectional view of the fluid dispenser similar to that shown in FIG. 11 with the fluid metering cover in the closed position.

The present invention employs a manually activated fluid dispensing system, the features of which can be seen in FIGS. 10 through 12. This system comprises a fluid dispenser or reservoir 78 divided into two compartments 87, each compartment 87 having an opening 80 at its lowest point. Tubes 82 at one end are connected to the openings 80 and at the other end are extended over the openings 61 in the backs of the pad swing plates 60 opposite the pads 56. Fluid dispenser 78 is provided with a pivoted fluid metering cover 86. This fluid metering cover 86 is provided with two cavities 83 connected by a relatively narrow channel 85, the purpose of which is to equalize the fluid level in the cavities 83. With the fluid metering cover 86 in the open position as shown in FIG. 11, an operator can dispense fluid into the cavities 83 of the fluid metering cover 86. After the fluid levels in the cavities 83 have equalized by means of fluid flowing between the cavities 83 through channel 85, fluid metering cover 86 may then be closed as shown in FIG. 12, spilling the fluid in the two cavities 83 into the corresponding compartments 87 of the fluid dispenser 78. From the fluid dispenser 78, the fluid will flow under the force of gravity through the tubes 82 out of their ends, and into the openings 61 in the backs of the pad swing plates 60, where the fluid will saturate the pads 56. Any excess fluid may drip into the trays 110 located on either side of the media compartment 32 below the pads 56.

After the floppy disk 22 has been inserted into the media compartment 32 and conditioning fluid has been provided to the cavities 83 of the fluid metering cover 86, the cover 86 closed and the fluid allowed to saturate the pads 56, the shaft 40 may be rotated so that the clutch 36 and the spindle 38 grasp the floppy disk 22 and in order that the pads 56 swing into contact with the floppy disk 22 through the read/write openings 28.

In the first preferred embodiment of the present invention, the rotation of the shaft 40 to engage the clutch 36 and to swing the pads 56 into contact with the floppy disk 22 also initiates the starting of the electric motor 88 which rotates the spindle 38 and consequently the engaged clutch 36 and the floppy disk 22. In this preferred embodiment of the present invention, the activation of the electrical motor 88 occurs automatically when the shaft is rotated a sufficient amount so that the annular surfaces 37 and 39 on the clutch 36 and spindle 38 respectively have grasped the floppy disk in an area adjacent to its central opening 28. This activation is accomplished by a starting pin 98, which radially extends from the shaft 40, depressing a leaf spring 96 of a starting microswitch 94. The pressing of starting microswitch 94 starts the electric motor 88 so that the floppy disk 22 grasped between the clutch 36 and the spindle 38 begins to rotate and the pads 56 begin to condition the surfaces of the floppy disk 22.

Simultaneously, a small timer motor 100 is started. Timer motor 100 is mounted on the outside of the media compartment 32 adjacent to the mechanism enclosure 52 and the shaft 40 and the other components of the clutch engaging and disengaging mechanism 45. Timer motor 100 is provided with a timer cam 102 on its shaft. As will be subsequently described in more detail, timer cam 102, during the operation of the timer motor 100, rotates and presses against the end of the clutch engaging pin or cam follower 50, thereby causing the shaft 40 to rotate slightly and to swing the pad swing plates 60 and the foam pads 56 away from and out of contact with the floppy disk 22.

This rotation imparted to the shaft 40 by the timer cam 102 pressing against the end of the clutch engaging pin or cam follower 50 is, however, not sufficient to disengage the clutch 36 and the spindle 38 and to thus release their grasp of the floppy disk 22. The floppy disk 22, therefore, continues rotating with the pads 56 out of contact with its surfaces, thereby permitting the conditioning fluid on the floppy disk 22 to evaporate. This assures that streaks or parting lines from the conditioning fluid are not left on the floppy disk 22.

Thereafter, the timer cam 102 rotates against the leaf spring 106 of a stopping microswitch 104. This stops the timer motor 100 and the electric motor 88, and completes the conditioning procedure.

Figure 5:
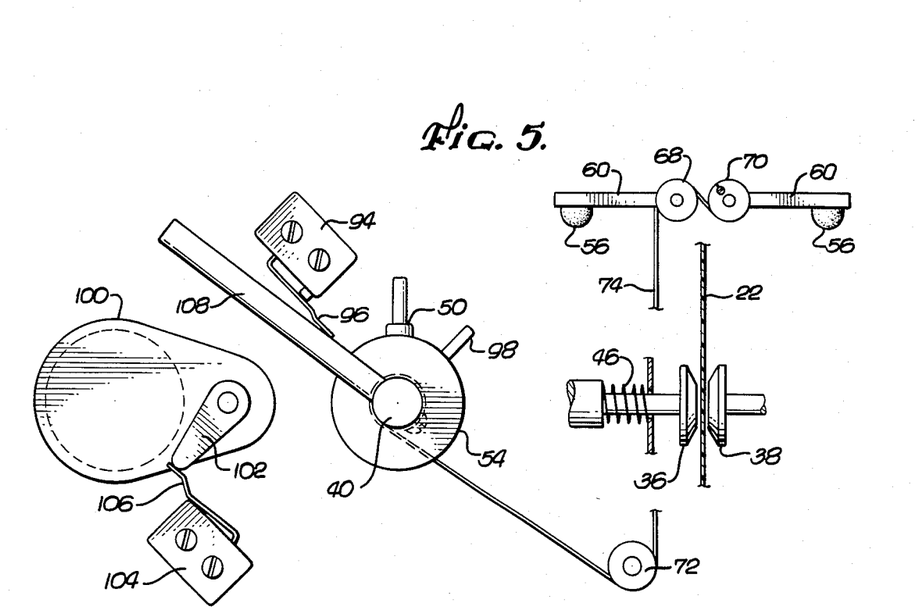
FIG. 5 illustrates the positions of the components of the preferred embodiment of the present invention shown in FIG. 1 prior to or after a floppy disk has been conditioned.

A more detailed description of the operation of the first preferred embodiment of the present invention will be given with reference to FIGS. 5 through 8. FIG. 5 illustrates the positions of the components of the present invention before the conditioning procedure has begun. In FIG. 5, a floppy disk 22 is shown inserted into the apparatus 20 but the clutch 36 and spindle 38 are not engaged to grasp the floppy disk 22. The shaft 40, whose rotation is controlled by the lever 108, is oriented so that the clutch engaging pin or cam follower 50 is resting on that part of the surface 57 of axial cam 54 that is furthest from the floppy disk 22, such as is illustrated most clearly in FIGS. 4 and 9. The timer cam 102 is in its initial position, which is also its final position from the last time that the apparatus 20 was used, i.e., it is depressing the leaf spring 106 of the stopping microswitch 104.

After the floppy disk 22 has been inserted into the apparatus 20, the pivoted fluid metering cover 86 is filled with conditioning fluid and the level of fluid in the two cavities 83 of the metering cover 86 is allowed to equalize. The metering cover 86 is then closed spilling the fluid in the cavities 83 into the respective compartments 87 in the fluid dispenser 78. The conditioning fluid travels through the tubes 82 due to the force of gravity and drips into the openings 61 located opposite the pads 56 in the backs of the pad swing plates 60.

After the pads 56 have been thoroughly saturated with the conditioning fluid from the fluid dispenser 78, the excess fluid is allowed to drip into the trays 110. Thereafter, the conditioning cycle may begin.

Figure 6:
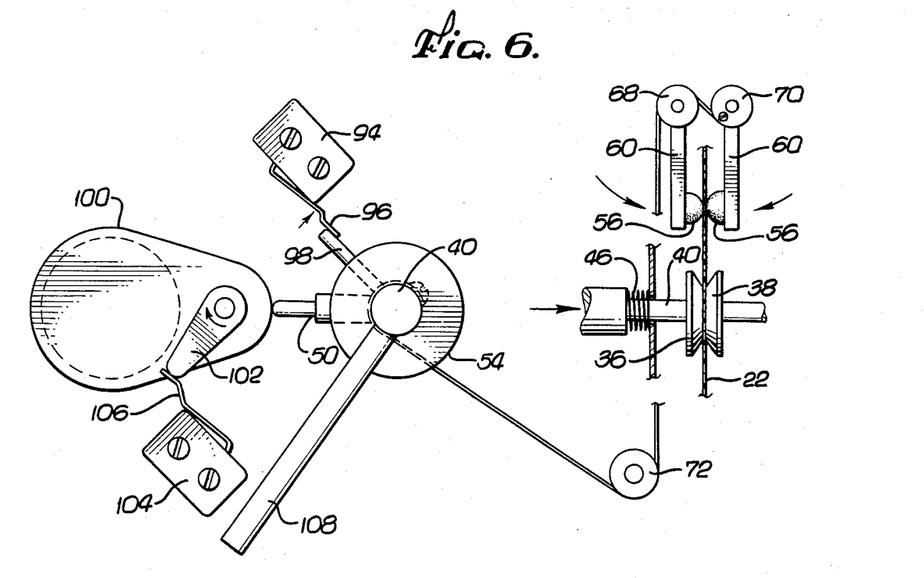
FIG. 6 illustrates the positions of the components of the preferred embodiment of the present invention shown in FIG. 1 after the lever of the clutch engaging mechanism has been rotated clockwise in order to initiate the conditioning cycle.
Figure 9:
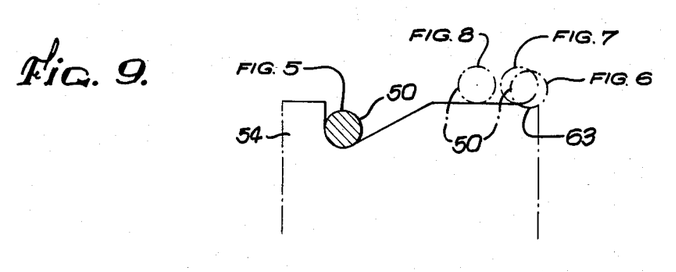
FIG. 9 is a developed view of the helically-surfaced cam and the clutch engaging pin or cam follower used in the preferred embodiment shown in FIG. 1, showing the relative positions at various times before and during the conditioning procedure.

The lever 108 attached to the shaft 40 is rotated clockwise approximately three-quarters of a revolution as shown in FIG. 6. This rotation causes the clutch engaging pin or cam follower 50 to ride along the helical cam surface 57 of the axial cam 54, thus moving the shaft 40 longitudinally in the direction toward the floppy disk 22 opposite to the force exerted by spring 46. This longitudinal motion of the shaft 40 engages the clutch 36 with the spindle 38, i.e., the annular surface 37 on the clutch presses the area 30 of the floppy disk adjacent to the central opening 26 against the O-ring 43 and the annular surface 39 of the spindle 38. At this point, the surface of the clutch engaging pin or cam follower 50 is pressed into the small detent 63 in the axial cam 54, as can be seen in FIG. 9, by the action of spring 46.

When the shaft 40 has been rotated so that the clutch engaging pin or cam follower 50 is in this position, the starting pin 98 which radially extends from the shaft 40 has rotated sufficiently to depress the leaf spring 96 of the starting microswitch 94. The pressing of this microswitch 94 starts the electric motor 88 which rotates the spindle 38 and hence the engaged clutch 36 and the floppy disk 22 and also starts the timer motor 100 which begins the clockwise rotation of the timer cam 102. In addition, the line 74 connected between the pulleys 68 and 70 and the shaft 40 is wound around the shaft 40, thus rotating pulley 70 clockwise and pulley 68 counterclockwise. These rotations of the pulleys result in the pad swing plates 60 being swung downward so that the pads 56 contact the floppy disk 22 through the read/write openings 28. The tension spring 76 prevents the pads 56 from being pressed against the floppy disk 22 with too great a force.

With the floppy disk 22 thus rotating and the foam pads 56 saturated with conditioning fluid placed into contact with the surfaces of the floppy disk 22, the surfaces of the floppy disk 22 can thus be conditioned.

Figure 7:
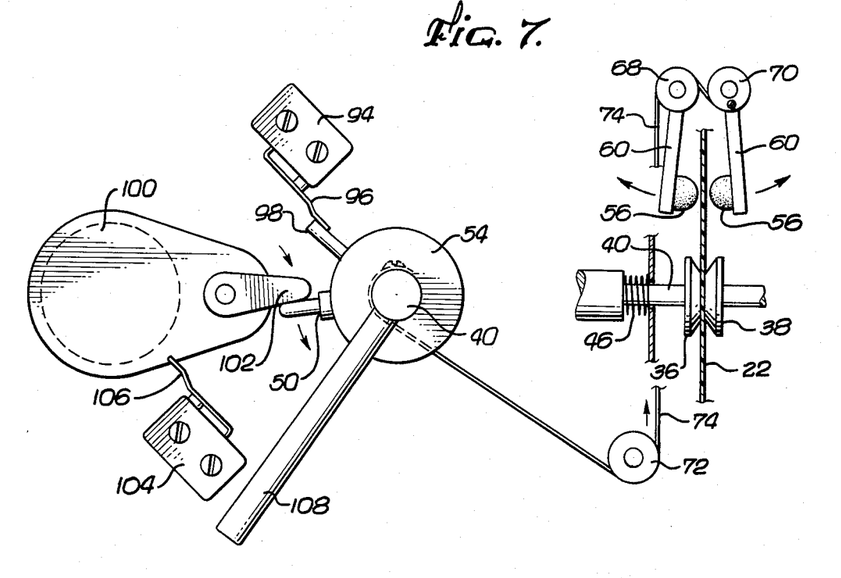
FIG. 7 illustrates the positions of the components of the preferred embodiment of the present invention shown in FIG. 1 after the timer cam has contacted the clutch engaging pin to initiate the removal of the pads from the surfaces of the floppy disk.

In FIG. 7, the apparatus 20 is shown after the timer cam 102 has rotated to the point where the end of the timer cam 102 has contacted the end of the clutch engaging pin or cam follower 50, and thereby caused the shaft 40 to rotate a small amount in the counterclockwise direction so that the clutch engaging pin or cam follower 50 no longer rests in the detent 63. This counterclockwise rotation of shaft 40 unwinds the line 74 slightly and releases some of the tension in line 74, permitting the return springs 64 for the pad swing plates 60 to pull the pad swing plates 60 and the pads 56 away from the surfaces of the floppy disk 22.

Figure 8:
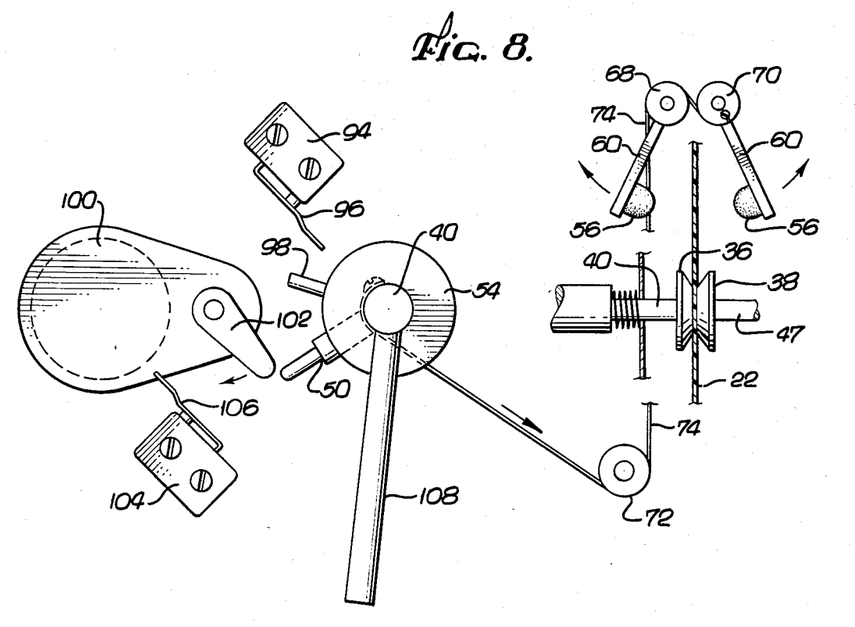
FIG. 8 illustrates the positions of the components of the preferred embodiment of the present invention shown in FIG. 1 after the timer cam has fully rotated the clutch engaging pin counterclockwise in order to remove the pads from the surfaces of the floppy disk.

As the timer cam 102 continues rotating in a clockwise direction, the clutch engaging pin or cam follower 50 is pushed to the position shown in FIGS. 8 and 9. The further counterclockwise rotation of shaft 40 causes the pads 56 on the pad swing plate 60 to be lifted further from the surface of the floppy disk 22. As will be noted from FIG. 9, however, the clutch engaging pin or cam follower 50 has not been pushed to the point where it is on the helical portion of the cam surface 57. Hence, the clutch 36 and spindle 38 remain engaged and grasping the floppy disk 22 so that it continues rotating. This permits all information bearing portions of the surfaces of the floppy disk 22 to pass by the read/write openings 28 in the floppy disk envelope 24 and any conditioning fluid remaining on the floppy disk surfaces to evaporate.

The timer cam 102 continues rotating past the clutch engaging pin or cam follower 50 until it depresses the leaf spring 106 of the stopping microswitch 104. The pressing of this microswitch 104 stops both the timer motor 100 and the electric motor 88 which rotates the floppy disk 22. After the floppy disk 22 has ceased rotating, lever 108 may be rotated counterclockwise to the position shown in FIG. 5. During this rotation, spring 46 forces the clutch engaging pin or cam follower 50 against the helical portion of the cam surface 57. This imparts a longitudinal motion to the shaft 40 away from the floppy disk 22, thereby disengaging the clutch 36 and the spindle 38 and releasing their grasp on the floppy disk 22. The rotation also unwinds line 74, releasing the tension in that line and allowing the return springs 64 to pull the pad swing plates 60 to horizontal positons away from the floppy disk 22. At this point, the conditioning procedure is complete and a cleaned, lubricated and de-staticized floppy disk can be lifted vertically out of the media compartment 32.

It is found that lubricant which was initially dissolved in the conditioning fluid used for the previous conditioning of a floppy disk 22 accumulates on the pads 56 after the more volatile components of the conditioning fluid have evaporated from the pads 56. If this accumulated lubricant is not dissolved or otherwise removed from the pads 56, unacceptable visual marks may be left on the floppy disk 22 after conditioning. By permitting the conditioning fluid on the pads 56 to remain there for an interval of time prior to placing the pads 56 into contact with the floppy disk 22, the accumulated lubricant may be dissolved and/or flushed away, eliminating the problem.

In the first preferred embodiment of the present invention which has just been described, at any time after the conditioning fluid from the fluid dispenser 78 is dispensed to the pads 56, the lever 108 attached to the shaft 40 may be rotated in order to grasp the floppy disk 22 and to place the pads 56 into contact with the floppy disk 22. In the second preferred embodiment of the present invention to be described, the pads 56 are placed into contact with the floppy disk 22 at a predetermined time after the conditioning fluid has been dispensed to the pads 56 and the timer motor 100 has been activated. During this time period, the conditioning fluid on the pads 56 dissolves and flushes away the lubricant left on the pads 56 from previous conditionings of floppy disks with the apparatus.

Figure 13:
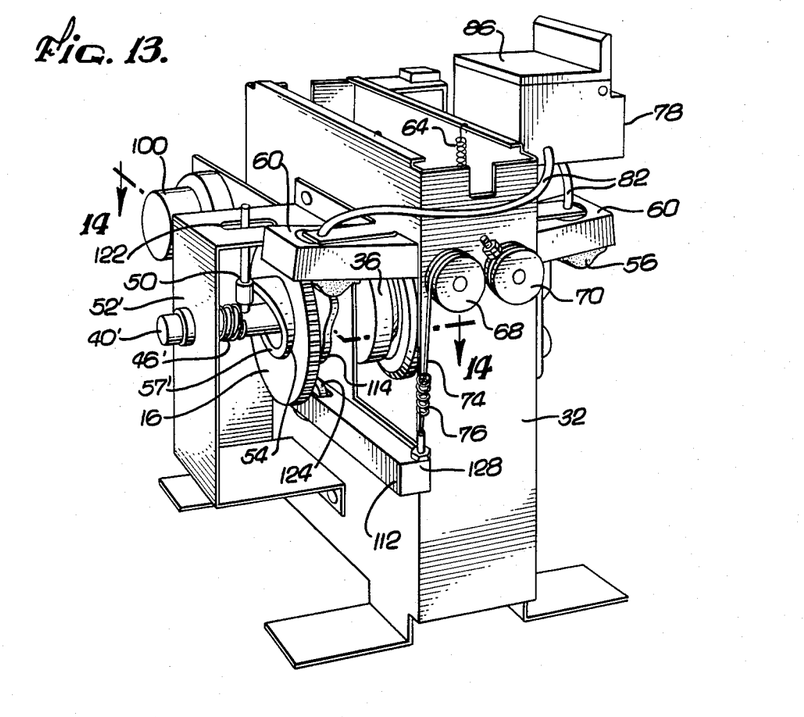
FIG. 13 is a perspective view of a second preferred embodiment of the present invention.

The second preferred embodiment will mainly be described in the respects in which it materially differs from the first preferred embodiment. A simplified perspective view of this embodiment is shown in FIG. 13. In the second preferred embodiment, the pad swing plates 60 are attached by means of the line 74 (which proceeds around pulleys 68 and 70 as has been described with respect to the first preferred embodiment) to the end of actuating arm 112. The rotation of actuating arm 112 about its pivot point 126 is controlled by a radial cam 114 mounted on the shaft 40'. In the second preferred embodiment, shaft 40' is rotated by means of the timer motor 100, as will be described, so that the actuating arm 112 which is engaged with the radial cam 114 mounted on the shaft 40' is also controlled by the timer motor 100. Both the axial cam 54', which is similar to the axial cam 54 of the first preferred embodiment, and the radial cam 114 are attached to a gear wheel 116 mounted coaxially on the shaft 40'. The teeth of gear wheel 116 are engaged by the teeth of a gear wheel 118 mounted on the shaft 120 of the timer motor 100.

The clutch engaging pin or cam follower 50 extends radially from the shaft 40'. Neither the cam follower 50 nor the shaft 40' rotates, but they do move axially along the disk axis due to the interaction of the clutch engaging pin or cam follower 50 and the axial cam 54' in order to engage and disengage the clutch 36. The end of the clutch engaging pin or cam follower 50 rides in a slot 122 parallel to shaft 40' located in the top side of mechanism enclosure 52'.

Figure 14:
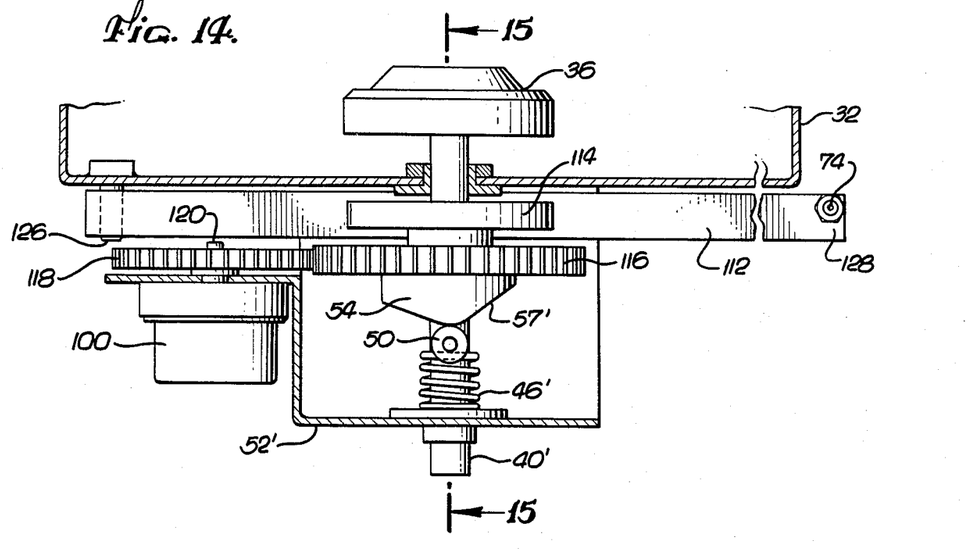
FIG. 14 is a partial cross-sectional view of a portion of the second preferred embodiment of the present invention looking downward taken along the lines 14—14 in FIG. 13.
Figure 15:
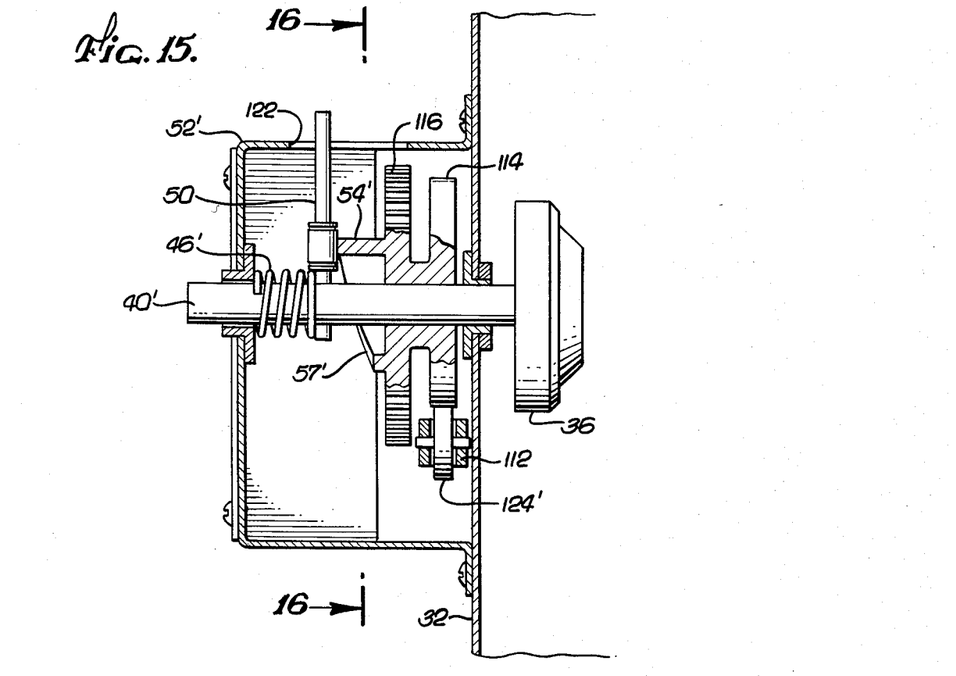
FIG. 15 is a cross-sectional view of a portion of the apparatus of the second preferred embodiment of the present invention taken along the lines 15—15 in FIG. 14.
Figure 16:
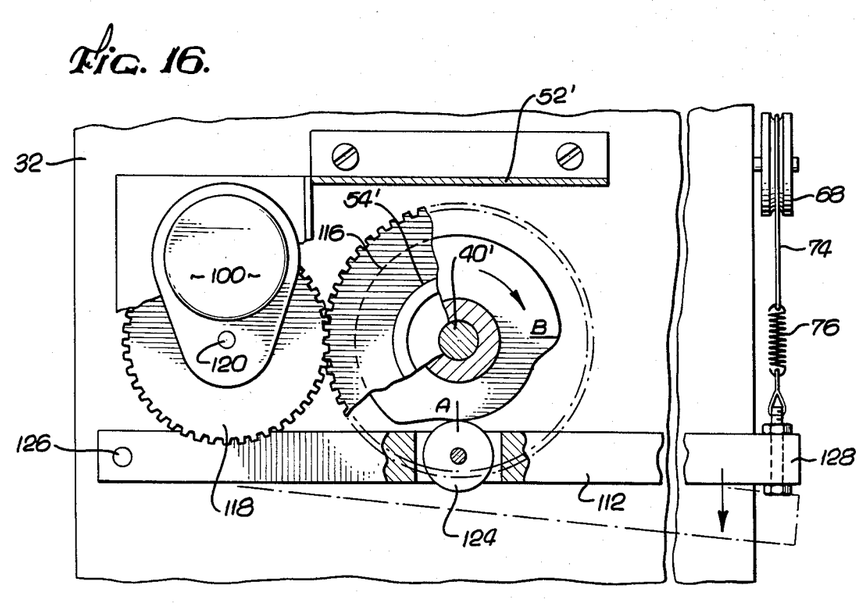
FIG. 16 is a cross-sectional view, partially cut away of a portion of the second preferred embodiment of the present invention taken along the lines 16—16 in FIG. 15.

The construction and operation of the second preferred embodiment of the present invention can be understood most clearly with reference to FIGS. 14, 15 and 16. The gear wheel 118 is attached to the shaft 120 of the timer motor 100. The teeth of gear wheel 118 interact with the teeth of gear wheel 116 which is mounted coaxially with bearings on shaft 40', which itself does not rotate. Attached to gear wheel 116 are an axial cam 54' and a radial cam 114, so that these cams are controlled by the rotation of gear wheel 116 which is in turn controlled by the rotation of gear wheel 118 attached to the timer motor 100.

The functioning of axial cam 54' is similar in principle to that described with respect to axial cam 54 for the first preferred embodiment. However axial cam 54' does not have an abrupt change in its width as shown with respect to axial cam 54 in FIG. 4 but changes gradually so that relative rotation of cam follower 50 and axial cam 54' are not limited to one revolution. Clutch engaging pin or cam follower 50 is pressed against the surface 57' of axial cam 54' by spring 46' mounted coaxially around shaft 40' between mechanism enclosure 52' and clutch engaging pin or cam follower 50. With the axial cam 54' rotated so that cam follower 50 is riding on the widest portion of axial cam 54', as shown in FIG. 14, the clutch 36 is disengaged from the spindle 38 and floppy disk 22. As axial cam 54' is rotated by means of the rotation of the gear wheels 118 and 116 so that the cam follower 50 rides on a less wide portion of axial cam 54', the force of spring 46' will move the shaft 40' axially toward the floppy disk 22, and the clutch 36 will engage the floppy disk 22 and the spindle 38.

Actuating arm 112 is a generally straight member attached at one end to the side wall of the media compartment 32 by means of a pivot 126 which permits actuating arm 112 to rotate about an axis parallel to shaft 40'. Line 74 is attached through spring 76 to the end 128 of actuating arm 112 so that as actuating arm 112 rotates about the pivot 126, the tension in line 74 and spring 76 is increased or decreased moving the pads 56 into or out of contact with the floppy disk 22 in cooperation with return springs 64. Roller 124 is attached to actuating arm 112 at a point approximately in the middle of actuating arm 152 so that it rotates about an axis parallel to the shaft 40'. The force of the return springs 64, transmitted through the shafts 62, the pulleys 70 and 68, the line 74 and the spring 76, pulls the end 128 of the actuating arm 112 upward so that the circumferential surface of roller 124 is pressed against the circumference of the radial cam 114.

The radial cam 114 comprises a disk whose radius has different values along different portions of its circumference. Over the major portion of its surface, the radial cam 114 has an almost constant radius. Over a smaller portion, the radius is significantly smaller. The change in radius between these portions is gradual.

With the radial cam 114 rotated as shown in FIG. 16 so that roller 124 contacts radial cam 114 at point A, the end 128 of actuating arm 112 is at its highest possible position so that the springs 64 rotate the pad swing plates 60 and pads 56 away from the surface of the floppy disk 22 to their horizontal position as shown in FIG. 13.

If the radial cam 114 is thereafter rotated in a clockwise direction as viewed in FIG. 16, the circumferential surface of the roller 124 will ride along the circumferential surface of the radial cam 114 and the end 128 of the actuating arm 112 will remain stationary until the radial cam 114 has rotated so that roller 124 contacts radial cam 114 in the area near point B on the circumferential surface of the radial cam 114. The larger radius of radial cam 114 at point B pushes roller 124 and hence the end 128 of actuating arm 124 downward, as shown in phantom in FIG. 16. This increases the tension on spring 76 and pulls the line 74 downward, so that the force of the return springs 64 is overcome and the pads 56 are swung downward into contact with the surfaces of the floppy disk 22 as has been described with respect to the first preferred embodiment. The pads 56 remain in contact with the floppy disk 22 until the radial cam has rotated so that it is contacting the roller 124 at a position where its radius begins to decrease again near point A. Thus, as the radius of the portion of the radial cam 114 in contact with the roller 124 decreases, the end 128 of the actuating arm 112 is gradually raised so that the pads 56 are correspondingly gradually lifted from the surfaces of the floppy disk 22.

In operation, after a floppy disk has been inserted into the media compartment 32, conditioning fluid is dispensed to cavities 83 of the fluid metering cover 86 as has been described with respect to the first preferred embodiment. The fluid metering cover 86 is then closed, spilling the fluid into the respective compartments 87 of the fluid dispenser 78. As has been described with respect to the first preferred embodiment, the pads 56 are thereby saturated with conditioning fluid. Thereafter, a switch is activated which starts the timer motor 100 and the electric motor 88 which rotates the spindle 38.

At the time this switch is activated, the clutch 36 is not engaged with the spindle 38 to grasp the floppy disk 22; the cam follower 50 is pressed against the widest portion of the cam 54' as shown in FIGS. 14 and 15. The radial cam 114 at this time is oriented so that its circumference impacts roller 124 at point A as shown in FIG. 16. Thereafter timer motor 100 slowly rotates the gear wheel 118 mounted on the shaft 120 in a counterclockwise direction as viewed in FIG. 16. This results in a clockwise rotation of gear wheel 116 and the cams that are attached to it, axial cam 54' and radial cam 114.

As axial cam 54' is rotated, cam follower 50 rides on progressively less wide portions of the axial cam 54', and cam follower 50 and shaft 40' are pushed by spring 46' toward the floppy disk 22 so that the clutch 36 is engaged with the spindle 38 to grasp and rotate the floppy disk 22. The initial rotation of the radial cam 114 from its position shown in FIG. 16 where point A is in contact with the roller 124 will not move the pads 56 into contact with the floppy disk 22 since the radius of the portion of the radial cam 114 in contact with the roller 124 does not initially change, as can be seen in FIG. 16. Thus, the conditioning fluid dispensed to the pads 56 is permitted time to dissolve and flush away the accumulated lubricant on the pads 56, as has been discussed.

The pads are brought into contact with the floppy disk 22 when the rotation of the radial cam 114 has progressed so that point B on its circumference comes into contact with the roller 124. At that point, the floppy disk is being rotated so that the conditioning fluid on the pads 56 is applied over the entire information storing surfaces of the floppy disk 22.

Thereafter the pads 56 are raised slightly off of the surfaces of the floppy disk 22 when the part of the radial cam 114 having a smaller radius begins contacting the roller 124 thereby moving the end 128 of the actuating arm 112 slightly upward. The clutch 36 remains engaged with the spindle 38 so that the floppy disk 22 continues rotating in order to permit the conditioning fluid on the floppy disk 22 to evaporate.

Continued rotation of the gear wheels 118 and 116 does result in the disengagement of the clutch 36 and the spindle 38 as the cam follower 50 begins riding on progressively wider portions of the axial cam 54'. A limit switch turns the timer motor 100 off when the axial cam 54' and the radial cam 114 have rotated to the positions as shown in FIGS. 14 and 16. The conditioning procedure is then complete and the floppy disk 22 may be removed from the media compartment 32.

It will be appreciated from the above-described preferred embodiments of the present invention that many alternative arrangements of components are possible and are within the scope of the present invention. Thus, the present invention is not intended to be limited to the particular embodiments specifically discussed hereinabove.

We claim:

1. A device for treating with fluid a floppy disk or the like disposed in an envelope and having a magnetic information storing surface comprising:
    means for releasably grasping said disk and rotating it about its center while said envelope remains stationary;
    a pad movable into contact with the magnetic information storing surface of the disk through a read-write opening in the envelope;
    fluid dispensing means for providing to said pad fluid for treating a floppy disk; and
    means for moving said pad into and out of contact with the information storing surface of the disk, said means mechanically coupled to said means for releasably grasping said disk and rotating it about its center.

2. A device for treating with fluid a floppy disk or the like having an information storing surface comprising:
    means for releasably grasping said disk and rotating it about its center comprising:
        a first means for contacting the first side of said disk near its center;
        a second means for contacting the second side of said disk opposite to said first means;
        axial movement means for moving, in a direction along the axis of the disk, said first means and said second means toward or away from each other, whereby said disk can be releasably grasped between said first and second means; and
    a disk rotating means for rotating said first or second means about the disk axis, whereby said disk can be rotated when said disk has been grasped between said first and second means;

a pad movable into contact with the information storing surface of the disk;

fluid dispensing means for providing to said pad fluid for treating a floppy disk; and means for moving said pad into and out of contact with the information storing surface of the disk; and wherein said means for moving said pad is mechanically coupled to said axial movement means so that after said axial movement means moves said first means and said second means toward each other said pad is placed into contact with the information storing surface of the disk.

3. A device as in claim 2 wherein said pad has a length spanning the entire radial width of the information storing surface of the disk, said pad spanning said radial width when placed into contact with the information storing surface of the disk.

4. A device as in claim 3 wherein said means for moving said pad comprises:

a mounting plate for said pad, said mounting plate rotatable so that said pad may be moved into or out of contact with the information storing surface of the disk;

a first spring means connected to said mounting plate for rotating said mounting plate in a direction tending to move said pad out of contact with the information storing surface of the disk; and a means for opposing said first spring means and for rotating said mounting plate in a direction tending to move said pad into contact with the information storing surface of the disk, said means coupled to said axial movement means.

5. A device as in claim 4 wherein said axial movement means comprises:

a shaft positioned along the axis of the disk, said shaft capable of moving along its length, said first means attached at one end of said shaft so as to be rotatable independently of said shaft;

an axial cam disposed around said shaft having an axial cam surface facing generally in a direction along said shaft, said axial cam surface having a helical portion the axis of which is along said shaft, said axial cam and said shaft rotatable relative to one another about said axis of the disk;

a pin protruding radially from said shaft riding on said axial cam surface;

biasing means tending to force said pin against said cam surface; and means for rotating said shaft and said axial cam relative to one another so that said pin rides over said axial cam surface, said shaft thereby moving along its length when said pin rides over the helical portion of said axial cam surface.

6. A device as in claim 5 wherein said biasing means is a second spring means.

7. A device as in claims 2 or 6 further comprising a timer for controlling said axial movement means and said means for moving said pad into and out of contact with the information storing surface of the disk.

8. A device as in claim 7 wherein said means for opposing said first spring means and for rotating said mounting plate comprises:

a pivoted arm coupled to said mounting plate whereby said mounting plate is rotated as said pivoted arm is moved; and a radial cam disposed around said shaft pressing on said arm, whereby said arm is moved when said radial cam is rotated about said shaft.

9. An apparatus for reating with a fluid a floppy disk having a central opening and disposed in an envelope provided with openings for read/write heads comprising:

means for securing the envelope of the floppy disk so that the disk can be rotated abouts its axis within the envelope with the envelope remaining stationary;

means for rotating the floppy disk;

at least one pad capable of containing fluid for treating a floppy disk surface; and pad disposing means for placing said at least one pad into contact with a floppy disk through an opening for a read/write head in the envelope, said pad disposing means mechanically coupled to said means for rotating so that said pad is in contact with the floppy disk only while said disk is rotating.

10. An apparatus as in claim 9 wherein said means for rotating comprises:

an electric motor having a spindle located along the disk axis;

a member mounted concentrically on said spindle to rotate with said spindle having an annular surface normal to the disk axis and facing the disk, said annular surface sized to contact the disk in the region adjacent to its central opening;

a second member having an annular surface concentric with and normal to the disk axis and facing the second surface of the disk, said annular surface sized to contact the disk in the region adjacent to its central opering; and means for moving said first and second member relative to one another so that said annular surfaces on said first and second members are placed into contact with and grasp said disk.

* * * * *